United States Patent [19]
Staats, Sr. et al.

[11] 3,768,239
[45] Oct. 30, 1973

[54] FRUIT PICKER

[76] Inventors: Louis T. Staats, Sr., 1032 Minnehaha Avenue, Clermont; Fred H. Adkinson, P.O. Box 158, Minneola, both of Fla. 32755

[22] Filed: Jan. 20, 1972

[21] Appl. No.: 219,447

[52] U.S. Cl. .............................. 56/328 R
[51] Int. Cl. ............................... A01g 19/00
[58] Field of Search ...................... 56/328 R

[56] References Cited
UNITED STATES PATENTS

| | | | |
|---|---|---|---|
| 3,413,787 | 12/1968 | Van Antwerp et al. | 56/328 R |
| 3,537,245 | 11/1970 | Smith | 56/328 R |
| 3,507,105 | 4/1970 | Mays et al. | 56/328 R |
| 3,401,514 | 9/1968 | Clark | 56/328 R |
| 3,523,404 | 8/1970 | Girardi | 56/328 R X |
| 3,485,024 | 12/1969 | Collins | 56/328 R |
| 3,427,796 | 2/1969 | McCray et al. | 56/328 R |
| 3,464,195 | 9/1969 | Crichfield | 56/328 R |
| 3,413,786 | 12/1968 | Wehr | 56/328 R |
| 3,530,654 | 9/1970 | Staats, Sr. et al. | 56/328 R |
| 3,447,293 | 6/1969 | Townsend | 56/328 R |

FOREIGN PATENTS OR APPLICATIONS

| | | | |
|---|---|---|---|
| 1,421,857 | 11/1965 | France | 56/328 R |

*Primary Examiner*—Louis G. Mancene
*Assistant Examiner*—J. A. Oliff
*Attorney*—Munson H. Lane et al.

[57] ABSTRACT

A fruit picker head is mounted by a universal-type joint on a movable supporting boom so that it may be vertically tilted and horizontally swung independently of movement of the boom. Reciprocating hydraulic motors are provided for swinging and tilting the head relative to the boom. The picker head comprises a telescoping sectional fruit containing receptacle having a rear portion attached to the boom by the joint and a projectable and retractable front portion equipped with a clamshell-type comb which opens and closes around a rotary auger to gather fruit when the fruit receptacle portion is projected into and retracted from tree branches. Separate motors are provided for actuating the clamshell-type comb and the rotary auger. A self leveling operator's seat is supported at one side of the picker head and controls are provided at the seat for controlling the motors which actuate various components of the machine. Separate motors are provided for projecting and retracting the front receptacle portion relative to the rear portion, for opening and closing said claimshell-type comb, and for rotating said auger. A self-leveling operator's seat is supported at one side of the picker head and controls are provided at the seat for controlling the various motors which actuate various components of the machine. The controls for the motors for projecting and retracting the front receptacle portion, for opening and closing the clamshell-type comb, and for rotating the auger are interrelated so that the front receptacle portion can be moved only when the comb is fully opened or closed, and the auger can be rotated only when the comb is closed.

14 Claims, 12 Drawing Figures

PATENTED OCT 30 1973 3,768,239

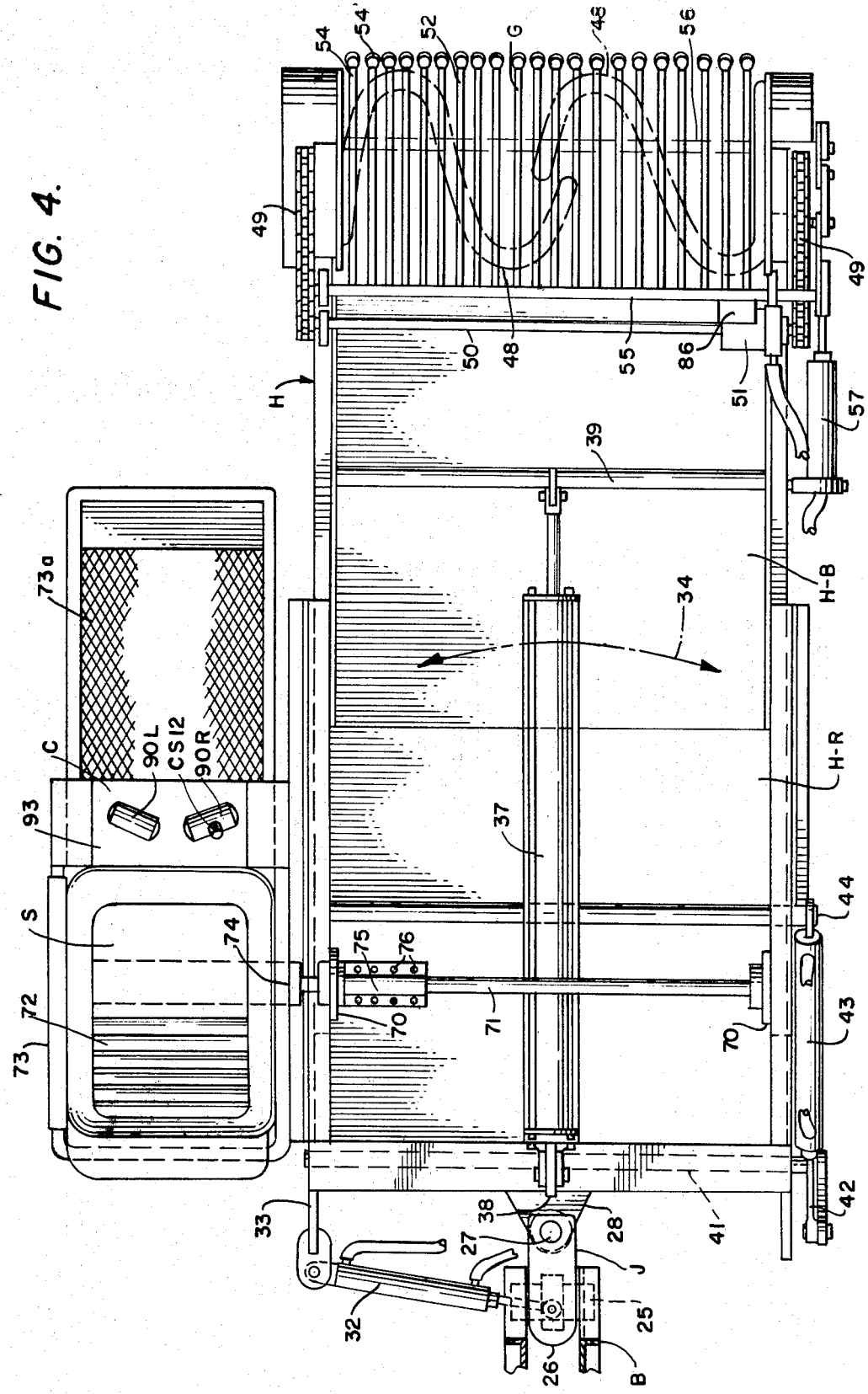

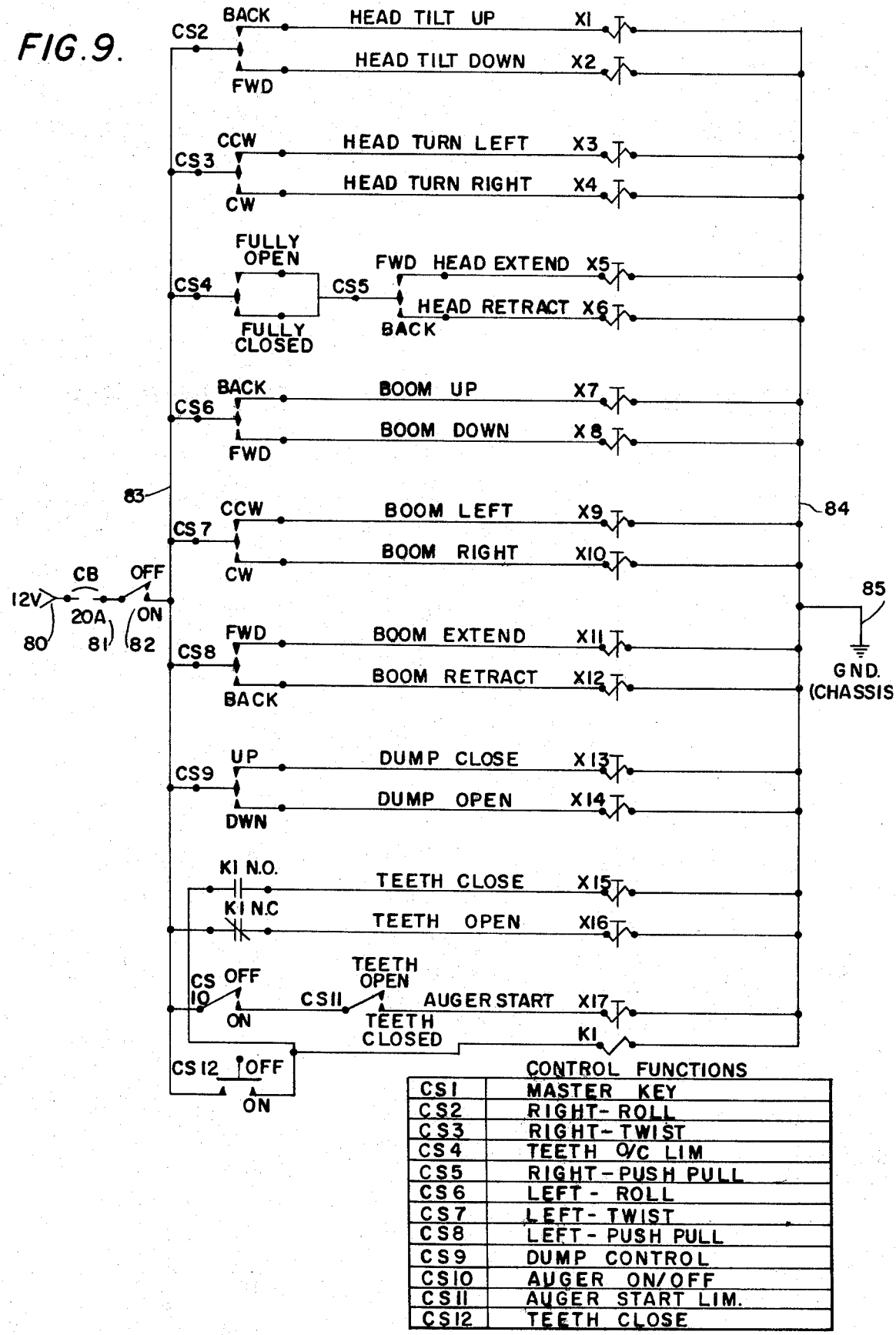

FRUIT PICKER

This invention relates to new and useful improvements in fruit pickers, particularly those used for mechanical harvesting of citrus fruits, in which a picker head equipped with fruit gathering means is carried by a movable supporting boom.

Examples of such picker heads appear in U.S. Pat. Nos. 3,475,888 issued Nov. 4, 1969 and 3,530,654 issued Sept. 29, 1970 to L. T. Staats, Sr., C. D. Misener and F. B. Innis, the latter patent also showing a movable boom for supporting the head.

The present invention embodies a number of structural and functional improvements in machines of the type disclosed in the above-mentioned patents, the principal object of the invention being to greatly facilitate the picking of fruit and increase the output of the machine, while at the same time reducing damage to the fruit and trees during the picking operation.

As such, the invention provides a universal-type joint for mounting the picker head on the supporting boom; a picker head having a projectable and retractable fruit gathering basket which may be projected into and retracted from tree branches without movement of the supporting boom; a fruit gathering mechanism including a clamshell-type comb which opens and closes around a rotary auger; and an operator's seat carried by the picker head with controls at the seat whereby the entire machine may be effectively actuated and its operation conveniently supervised by the operator near the actual picking site.

With the foregoing more important object and features in view and such other objects and features which may become apparent as this specification proceeds, the invention will be understood from the following description taken in conjunction with the accompanying drawings, wherein like characters of reference are used to designate like parts, and wherein:

FIG. 4 is a top plan view of the picker head, also showing the operator's seat;

FIG. 9 is a circuit diagram of the electrical and hydraulic components;

Figure 1:
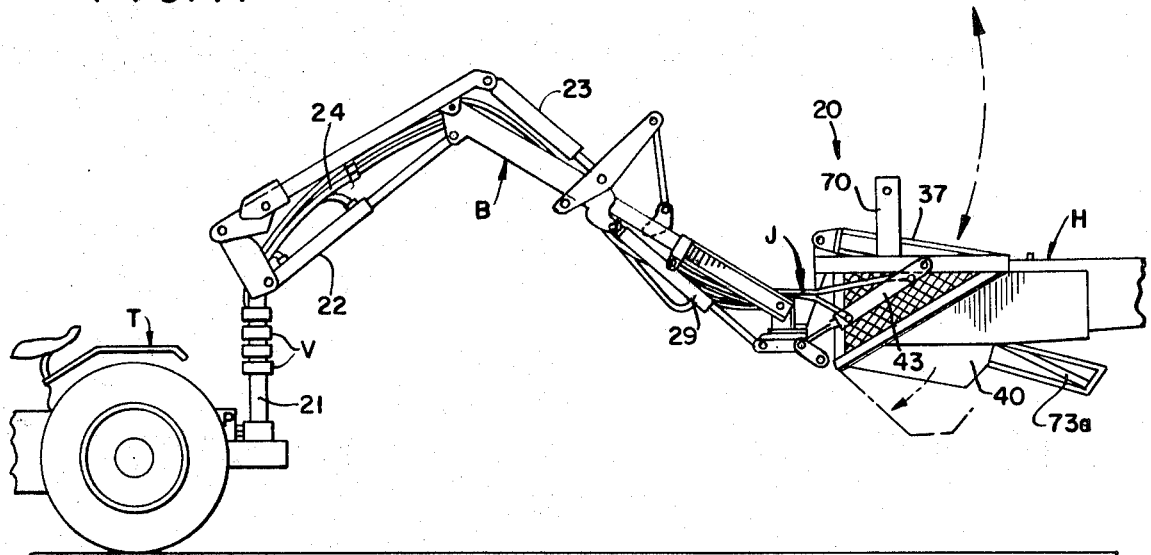
FIG. 1 is a fragmentary side elevational view of the improved fruit picker.

Referring now to the accompanying drawings in detail, more particularly to FIG. 1, the improved fruit picker designated generally as 20 comprises a picker head H carried by a movable supporting boom B which is mounted on a vehicle such as a tractor T, as for example by a rotatable pedestal 21 which permits the boom with the picker head to be swung horizontally for bringing the picker head in the proximity of a tree to be picked. The boom B itself may be of any suitable conventional type, including a plurality of boom sections movably connected and actuated by fluid operators such as those indicated at 22 and 23, whereby the picker head may be raised or lowered and the boom extended or retracted to place the picker head further away from or closer to the pedestal 21. Since the boom is conventional as aforesaid, a detailed description thereof here is not necessary.

The usual hydraulic system of the tractor T provides fluid under pressure to actuate the fluid operators 22, 23 as well as several others hereinafter described through suitable fluid supply and return lines 24, and the flow of fluid through these lines is controlled by solenoid valve means designated generally as V and conveniently mounted on the pedestal 21.

Figure 2:
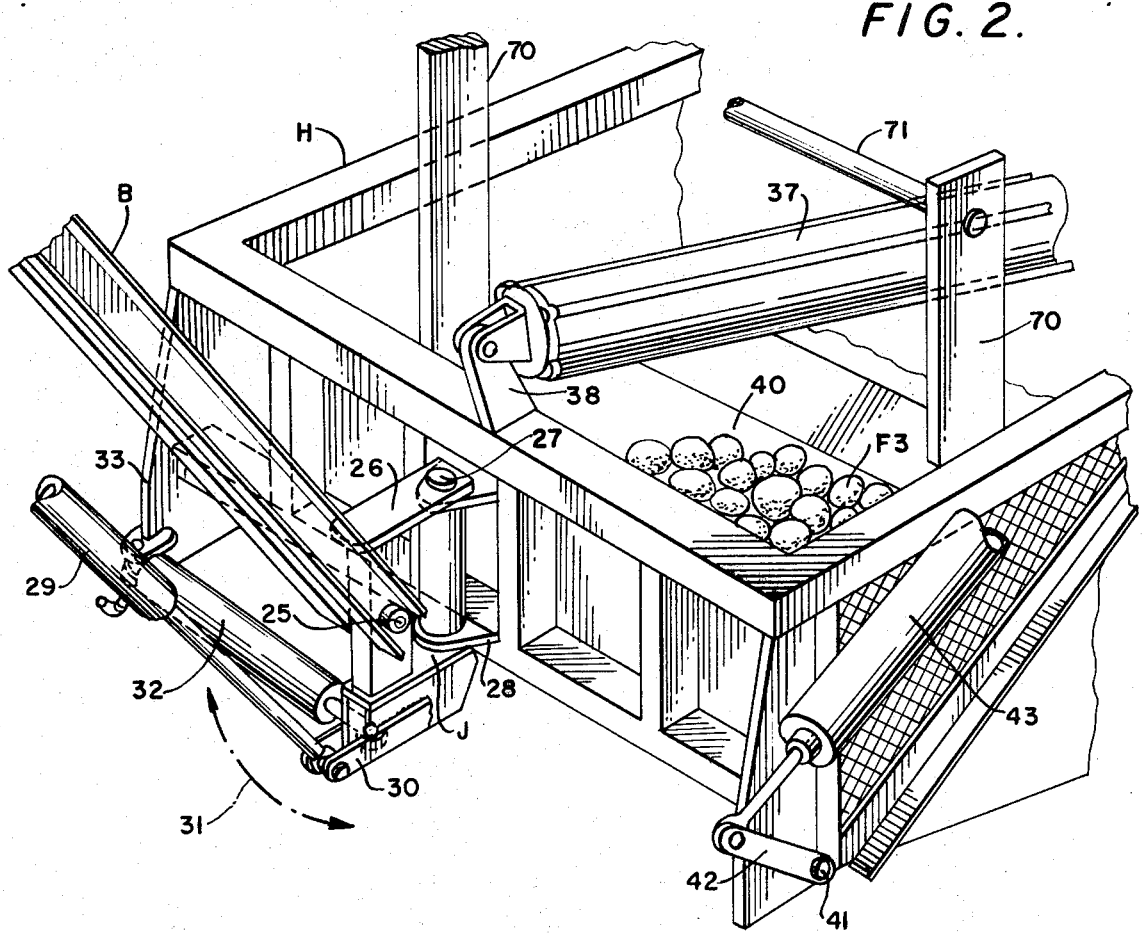
FIG. 2 is an enlarged, fragmentary perspective view showing the mounting of the picker head on the supporting boom.
Figure 3:
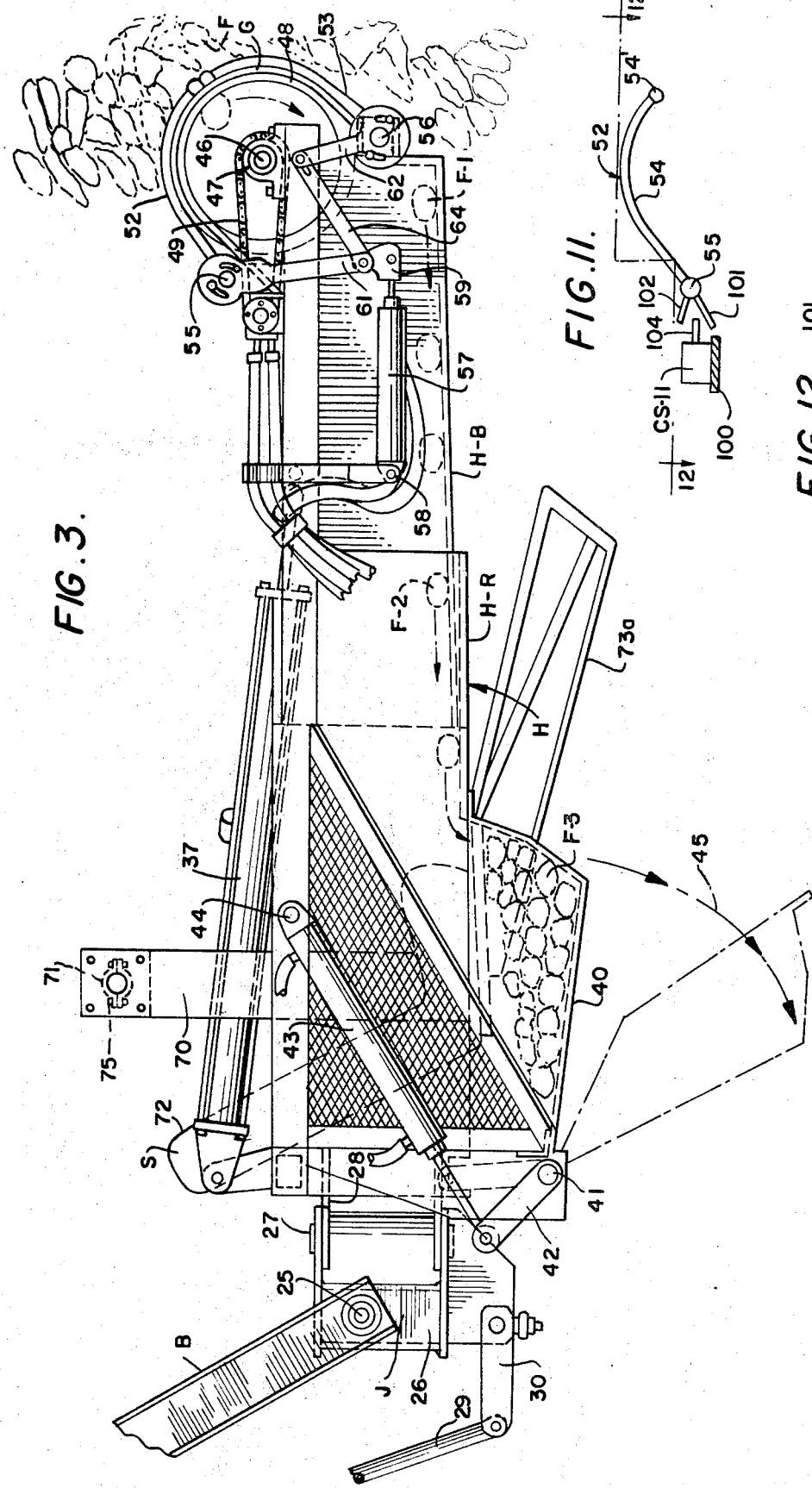
FIG. 3 is an enlarged side elevational view of the picker head.

One feature of the present invention involves the provision of a universal-type joint J for mounting the picker head H on the outer end of the boom B. As shown in FIGS. 2–4, the end of the boom is connected by a horizontal pivot pin 25 to a yoke 26 which in turn is connected by a vertical pivot pin 27 to ears 28 which are secured to the rear end of the picker head H. A fluid operator 29 reacts between the boom B and brackets 30 secured to the yoke 26 so that the yoke may be rocked about the pivot pin 25 as shown by the arrows 31 in FIG. 2 to tilt the entire picker head D in a vertical plane. Similarly, a fluid operator 32 reacts between the yoke 26 and a side plate 33 of the head H so that the head may be swung in a horizontal plane about the pivot pin 27, as indicated at 34 in FIG. 4. Thus, the universal-type joint J faciliates side-to-side swinging as well as up and down tilting movement of the picker head relative to the boom.

Figure 6:
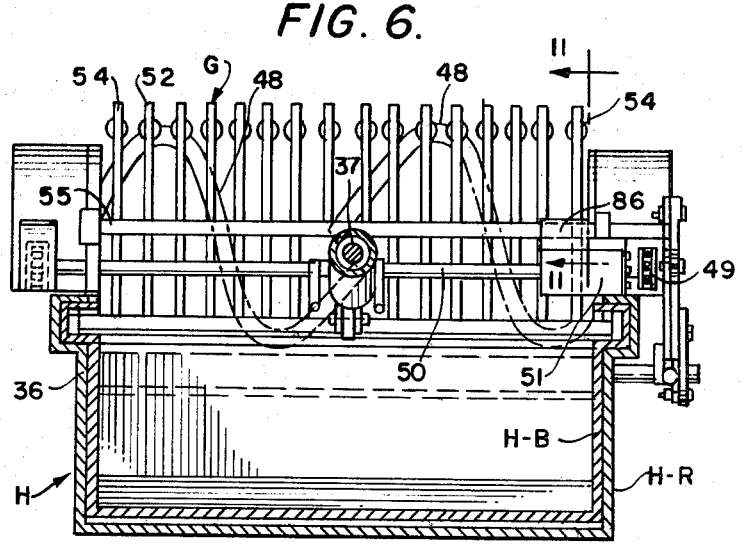
FIG. 6 is a cross-sectional view, taken substantially in the plane of the line 6—6 in FIG. 5.
Figure 7:
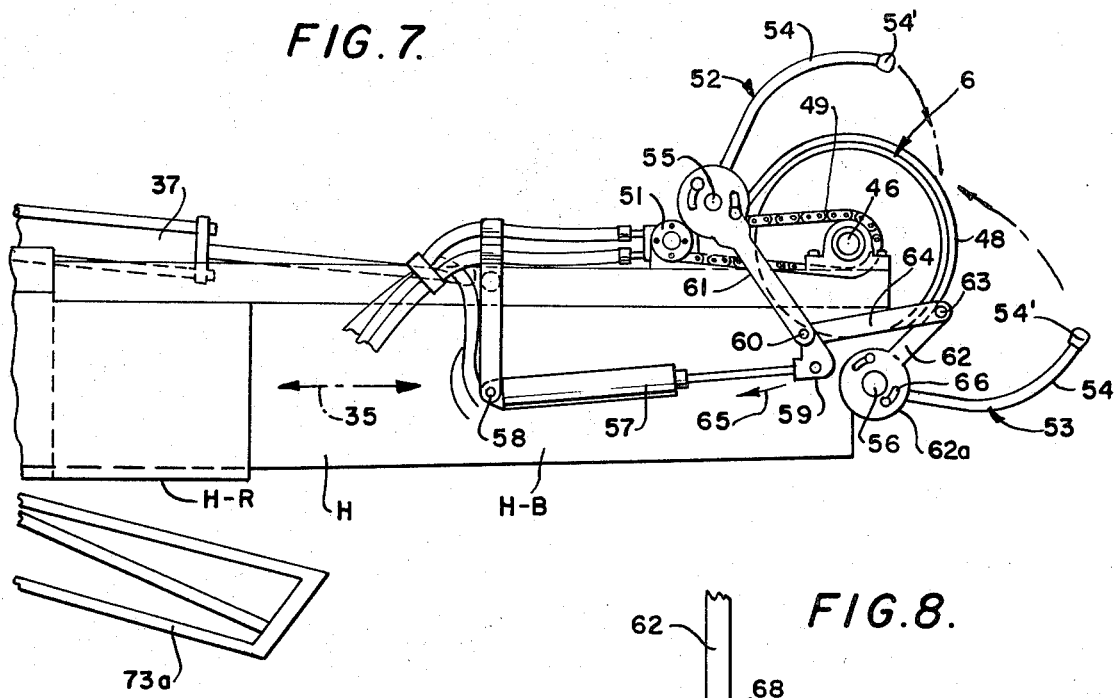
FIG. 7 is a fragmentary side elevational view of the picker head with the clamshell-type comb in the open position.

Another feature of the invention involves a two-piece construction of the picker head H, in that the same includes a rear portion H-R which is attached to the boom B by the joint J, and a front portion or basket H-B which is forwardly projectable and rearwardly retractable relative to the rear portion H-R, as indicated at 35 in FIG. 7. Conveniently, the two portions H-R and H-B are channel-shaped in cross-section and are slidably telescoped together as indicated at 36 in FIG. 6 so that the front portion or basket H-B may be slid forwardly or rearwardly relative to the rear portion H-R. The sliding of the basket H-B is effected by a fluid operator 37 which reacts between a bracket 38 secured to the rear end of the rear portion H-R and a cross shaft 39 which extends across the top of the basket H-B intermediate the ends thereof.

The front end of the basket H-B is provided with fruit gathering means designated generally as G and hereinafter described in detail. It will be apparent that the telescopic extension of the basket H-B enables the fruit gathering means G to be projected into tree branches and retracted therefrom solely by actuation of the fluid operator 37 and without any movement of the boom B. Such projection and retraction of the basket H-B can occur within the range of wrist-like movement of the head H as facilitated by the universal-type joint J and controlled by the fluid operators 29 and 31, so that the fruit picking operation of the gathering means G may be effectively performed without any movement of the boom B, except to relocate the picking head to another region of the tree.

The fruit gathered by the means G falls into the basket H-B as indicated at F-1 in FIG. 3, whereupon it rolls as at F-2 into the rear portion H-R of the head. The portion H-R serves as a receptacle for the fruit and has an openable dump bottom 40 in which the fruit accumulates as at F-3. The bottom 40 is pivoted to the head portion H-R by a shaft 41 which carries a crank 42 at one end thereof. A fluid operator 43 reacts between the crank 42 and a mounting pin 44 at one side of the head portion H-R, whereby the dump bottom 40 may be opened and closed, as indicated at 45.

The fruit gathering means G comprise an auger shaft 46 which is rotatably journalled in bearings 47 so that it extends across the open top of the basket H-B at the front of the basket, the auger shaft carrying a pair of oppositely spiralling augers 48. The shaft 46 is provided at the ends thereof with endless chain drives 49 connected to a countershaft 50 which is rotated by a hydraulic motor 51, thus causing rotation of the auger shaft.

The fruit gathering means also include a clamshell-type comb which constitutes another feature of the invention and consists of upper and lower comb members 52, 53 which cooperate with each other and with the augers 48 in gathering the fruit. The comb members 52, 53 are similar in construction, each including a set of transversely spaced teeth 54 carried by a cross shaft, that is, by cross shafts 55, 56 for the two comb units, respectively. The teeth 54 preferably have ball-shaped extremities 54' to avoid damaging the fruit. The cross shafts 55, 56 are rotatably journalled in suitable bearings on the front end portion of the basket H-B so that the two comb members 52, 53 may be swung toward and away from each other between an open position shown in FIG. 7 and a closed position shown, for example, in FIGS. 3 and 5. In their closed position the two comb members surround through approximately 180° the front and top of the augers 48 in substantially concentric relation, and the ball-shaped extremities 54' of the teeth 54 of the two comb members come close together.

Opening and closing of the comb members 52, 53 is effected by a fluid operator 57 which is pivotally mounted as at 58 at one side of the basket H-B. As is best shown in FIG. 7, the piston rod of the operator 57 has secured thereto a block 59 having a pivot 60 thereon. The cross shaft 55 of the comb member 52 has secured thereto a lever 61 which is connected by the pivot 60 to the block 59. Similarly, the cross shaft 56 of the comb member 53 has secured thereto a lever 62 which is pivoted as at 63 to a link 64, the latter in turn also being pivoted by the pivot 60 to the block 59. FIG. 7 shows the comb members 52, 53 in their open position in which the front and top of the augers 48 is exposed for engagement with tree branches. However, when the operator 57 is actuated to draw the block 59 in the direction of the arrow 65, the levers 61, 62 will partially rotate the shafts 55, 56 so as to swing the comb members 52, 53 toward each other to their closed position shown in FIGS. 3 and 5 wherein the teeth 54 of the comb members complementally surround the front and top of the augers 48.

Figure 8:
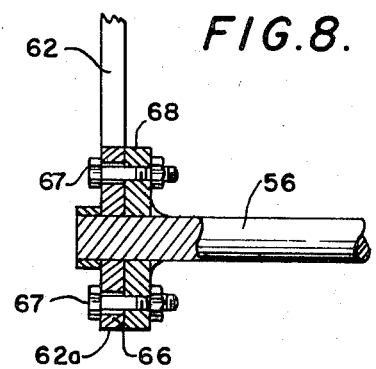
FIG. 8 is a fragmentary sectional detail of the adjusting means for the comb members.

It is desirable to provide some means for preadjusting the position of the comb members 52, 53 relative to each other and to the augers 48, so that closing of the comb members properly takes place. Thus, rather than securing the levers 61, 62 directly to the shafts 55, 56, adjusting means are provided as shown in detail in FIG. 8. The end portion of the lever 62 which fits on the shaft 56 is enlarged to form a circular plate 62a which is provided with arcuate slots 66 to receive bolts 67. These bolts extend through apertures in a second circular plate 68 which is fixed to the shaft 56, as by welding. Thus, when the bolts 67 are loosened, the shaft 56 with the plate 68 may be partially rotated within limits of movement of the bolts 67 in the arcuate slots 66, while the lever 62 with its plate 62a remains stationary. The same adjustable arrangement is used for mounting the lever 61 on the shaft 55, and it will be apparent from the foregoing that by virtue thereof, either or both comb members 52, 53 may be pre-adjusted relative to the other or to each other, and also relative to the augers 48, particularly in the closed position of the device. Of course, after the pre-adjustment has been made, the bolts 67 are tightened so that the shafts 55, 56 turn bodily with the levers 61, 62 under actuation of the operator 57.

At this point it may be noted that when the picker head H is positioned at a given location on a tree, the comb members 52, 53 may be opened and the picker head basket H-B projected forwardly into the tree branches. The comb members may then be closed so as to bring the tree branches and the fruit F thereon into engagement with the rotating augers 48 which twist the fruit off the branches, the fruit then falling into the basket H-B and subsequently passing into the receptacle constituted by the rear portion H-R of the head. The fruit removing operation performed by the augers 48 may be assisted by gradually retracting the basket H-B while the comb members 52, 53 are still closed, although if this is not desired or necessary, the comb members may be opened prior to retraction of the basket. In any event, a highly efficient picking operation is obtained with very little or no damage to the fruit or the tree.

Another feature of the invention involves the provision of a seat for the operator of the machine directly at the picker head, along with controls for actuating the various fluid cylinders, et cetera. In prior art devices the operator was usually located on the tractor T and in many instances his vision of the tree was obscured by the picker head, thus making it difficult to see the fruit to be picked and slowing down the entire operation. However, with the present invention, location of the operator's seat and controls directly on the picker head permits the operator to easily view the tree and the position of the picker head basket H-B relative to the fruit, so that the picking procedure is much more convenient and efficient. The operator's seat has self-leveling characteristics and automatically adjusts itself to raising, lowering and/or tilting of the picker head.

Figure 5:
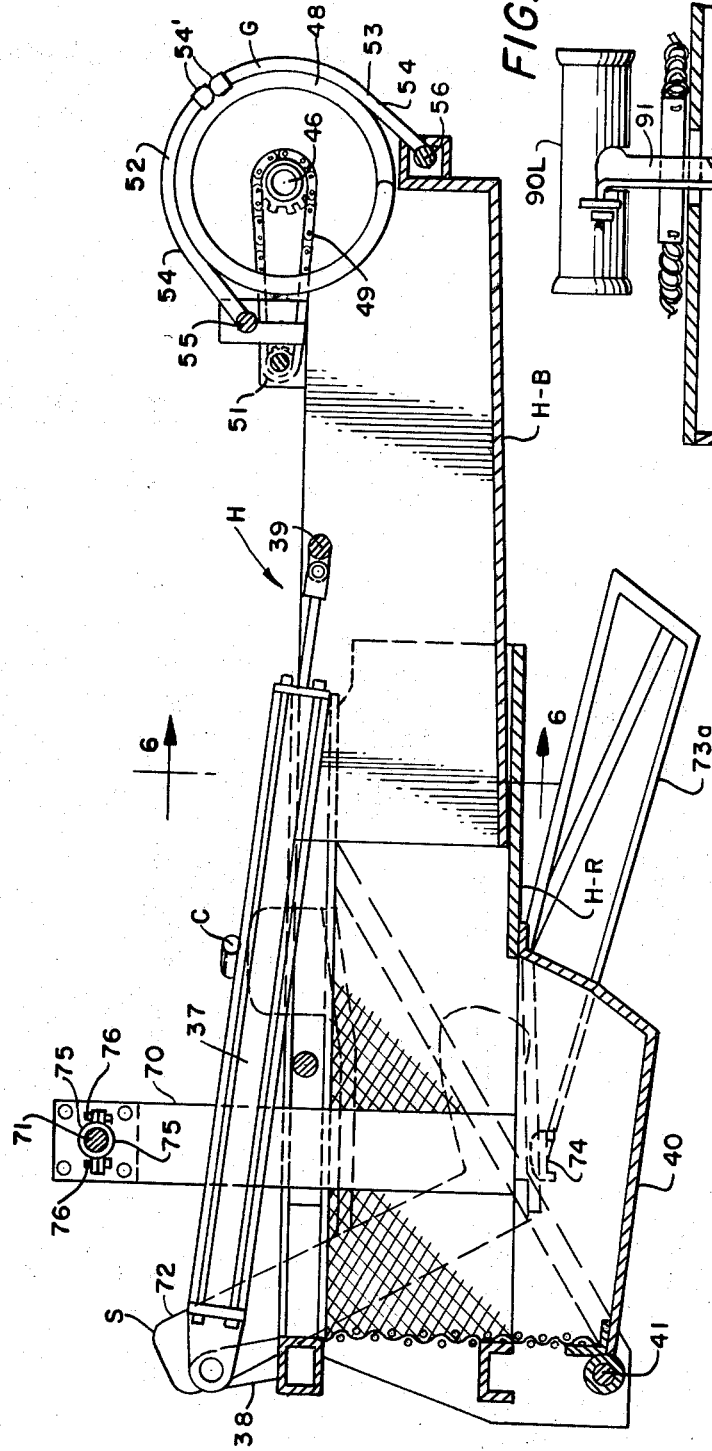
FIG. 5 is a longitudinal sectional view of the picker head.

As is best shown in FIGS. 4 and 5, a pair of upright standards 70 are provided at the opposite sides of the rear portion H-R of the picker head H, and a cross shaft 71 is rotatably journalled in the upper end portions of these standards, the cross shaft projecting to one side of the head portion H-R to carry the operator's seat S, as shown in the plan view of FIG. 4. The seat proper 72 is supported by a framework 73, having a forwardly and downwardly projecting extension 73a to accomodate the operator's legs. An L-shaped support member 74 is secured to the seat framework 73 and at its upper end is rigidly fixed to the cross shaft 71 so that in effect the entire seat S is suspended from the fulcrum constituted by the shaft 71 and is balanced to a self-leveling position regardless of raising, lowering and/or tilting of the picker head.

In order to prevent the seat from swinging too freely, particularly during movement of the head, an adjustable friction brake is provided, the same consisting of a pair of complemental half-sleeves 75 which are fixed to one of the standards 70 and enclose the adjacent portion of the rotatable shaft 71. The half-sleeves have apertured flanges connected together by adjusting bolts 76 and by tightening or looseing these bolts, the frictional drag between the fixed half-sleeves and the shaft may be increased or decreased so as to provide the desired amount of braking effect for limiting free swinging or oscillation of the seat S.

The seat S also carries a control console C which is disposed immediately in front of the seat proper 72 and contains various electrical switches, and the like, for controlling the operation of solenoid valves which actuate the various fluid operators, et cetera, of the machine. The control console C may be arranged in any suitable manner and an embodiment thereof will be briefly described hereinafter. In the meantime, attention is directed to FIG. 9 which diagramatically shows the electrical and hydraulic system of the invention.

The electric power supply 80 passes through a fuse 81 and through a master switch 82 to one side 83 of the circuits, the other side 84 being grounded as at 85. Several double-throw switches are connected to the circuit side 83 in series with respective solenoid valves and the circuit side 84, as presently described.

The switch CS2 in one position actuates the solenoid valve X1 and in the other position the valve X2, these valves controlling the operation of the hydraulic cylinder 29 which tilts the picker head H vertically about the fulcrum 25. Thus, in one position of the switch CS2, the picker head is tilted upwardly, in the other position it is tilted downwardly, and in the central position of the switch, the head remains stationary.

Similarly, the switch CS3 actuates the valves X3 and X4 which control the operation of the hydraulic cylinder 32 for swinging the picker head horizontally about the fulcrum 27, either to the left or to the right.

The switch CS6 actuates the valves X7 and X8 which control the cylinder 22 for raising and lowering the boom B along with the picker head.

The switch CS7 actuates the valves X9 and X10 which control a cylinder (not shown) on the tractor T for swinging the boom B to left or right.

The switch CS8 actuates the valves X11 and X12 which control the cylinder 23 for extending and retracting the boom.

The switch CS9 actuates the valves X13 and X14 which control the cylinder 43 for opening and closing the dump bottom 40 of the fruit receptacle in the picker head portion H-R.

Controls for extending and retracting the basket H-B are coordinated with those for opening and closing the comb members 52, 53 so that the comb members must be either fully open or fully closed before the basket can be slid in either direction. The comb members are normally kept in the open position because the "teeth open" circuit through a relay K1 is normally closed, this relay being in circuit with the solenoid valve X16 which actuates the cylinder 57 so as to open the comb members.

The switch CS5 actuates the valves X5 and X6 which control the cylinder 37 for projecting and retracting the basket H-B. The switch CS5 is in series with a limit switch CS4 which, together with another limit switch CS11, is located in a housing 86 (see FIG. 6) so as to be actuated by the comb members 52, 53 in the fully open and in the fully closed position of the same. The switch CS11 is in series with a switch CS10 and with a solenoid valve X17 which energizes the hydraulic motor 51 for rotating the augers 48.

With the comb members 52, 53 normally in the open position by the normally closed "teeth open" circuit through the relay K1, the basket H-B may be either extended or retracted by actuation of the switch CS5. When the basket is properly positioned, the comb members may be closed by pressing a push button switch CS12 which energizes the relay K1 to open the "teeth open" circuit and to close the "teeth closed" circuit through the solenoid valve X15, which causes the cylinder 57 to close the comb members. When they are closed, the limit switch CS4 is moved to the "fully closed" position and the switch CS11 is closed. Upon closing of the switch CS11, the switch CS10 may be actuated to start rotation of the augers 48, it being apparent that the augers can be rotated only when the comb members 52, 53 are in the closed position.

When the operator releases the push button switch CS12 and the switch opens, the relay K1 returns to the normal de-energized position and the comb members are opened. With this, the limit switch CS11 becomes open as soon as the comb members start their opening movement, and rotation of the augers 48 is discontinued.

The various solenoid valves such as X1, X2, etc. are located in the fluid lines in the valve means V on the pedestal 21. The limit switches CS4 and CS11 are in the housing 86 for actuation by the comb members 52, 53, while the rest of the switches such as CS2, CS3, etc. are located in the console C at the operator's seat S. As already noted, the console may be arranged in any suitable manner and one convenient arrangement thereof will now be briefly explained in connection with FIG. 4 and FIG. 10 which diagrammatically shows one half, that is the left-hand half, of the console.

A source of fluid pressure P, such as a hydraulic pump and reservoir and means for driving the pump are provided on the tractor T. The hydraulic flow line between the fluid pressure source and the solenoid valve V on the rotatable pedestal 21 may be connected through a rotary fluid joint on the pedestal so that the pedestal may turn without interference with the fluid line.

Figure 11:
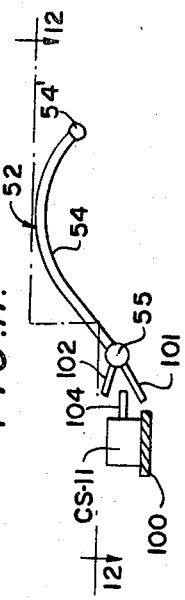
FIG. 11 is a vertical sectional detail taken substantially in the plane of the line 11—11 in FIG. 6 showing the upper comb and limit switches associated therewith.
Figure 12:
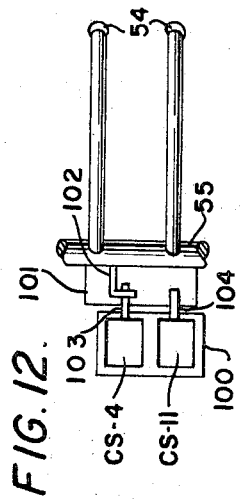
FIG. 12 is a horizontal sectional view taken substantially in the plane of the line 12—12 in FIG. 11.

FIGS. 11 and 12 show the relative position of the comb position sensing switches CS4 and CS11 with respect to the upper tooth bar 55. The switches CS4 and CS11 are mounted on a base plate 100 which is suitably supported to the rear of the tooth bar 55 on a fixed bracket adjacent the right hand side of the picker head as seen in FIG. 6. The housing 86 which normally covers the switches CS4 and CS11 is removed in FIGS. 11 and 12 for purpose of clarity. Switches CS4 and CS11 are operated by two fingers 101 and 102 which are adjustably mounted to the upper tooth bar 55. The fingers 101 and 102 face rearwardly to open and close the toggle switches CS4 and CS11 whose toggle arms 103 and 104 respectively face forwardly between the fingers. One finger 101 is wide so that it will operate both toggle arms 103 and 104 as it moves up (i.e. clockwise). The other finger 102 is narrow to operate only switch CS11 in the opposite direction of contact as the teeth open and close. The switch CS4 is operated alternately by the wide finger 101 and the narrow finger 102 when the teeth 54 are closed or open. When the switch CS4 is actuated in either direction on fully closing or fully opening the comb teeth, the picker basket head may be extended or retracted by manual actuation of the switch CS5 at the control console C. The switch CS4 is normally biased to a neutral open position between a pair of fixed contacts as shown diagrammatically in FIG. 9.

The switch CS11 is operated to closed position by the wide finger 101 in only one direction (i.e. up) when the teeth 54 are closed. It is normally resiliently biased to an open position when the teeth 54 are open.

Figure 10:
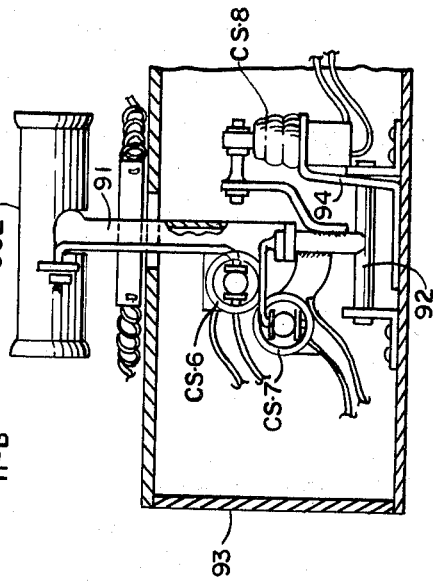
FIG. 10 is a fragmentary diagramatic view of the control console.

The console is provided with two main control handles 90L and 90R as seen in FIG. 4. As seen in FIG. 10, each control handle is carried by a post 91 supported by a rock shaft 92 in the console casing 93, so that the post 91 with the handle 90L may be bodily moved forwardly and rearwardly. This movement actuates the switch CS8 which is supported in the casing 93 by a bracket 94, so that forward and rearward movement of the handle 90L extends or retracts the boom B.

The post 91 may also be rotated about its own axis by turning the handle 90L to left or right, and this movement actuates the switch CS7 for swinging the boom to the left or right. Moreover, the handle 90L may be rotated about its own axis on top of the post 91, which actuates the switch CS6 for raising or lowering the boom.

The right-hand handle 90R is similarly arranged to actuate the switches CS2, CS3 and CS5 for tilting the picker head, swinging the same horizontally and extending or retracting the basket, respectively. In addition, the top of the handle 90R carries the push button switch CS12 for closing the comb members.

The master switch 82, the dumping switch CS9 and the auger switch CS10 are suitably located on the console casing 93 for actuation independently of each other and of the control handles 90L, 90R.

The arrangement of the control console, with the handles 90L, 90R which respond to natural movement of the operator's hands to perform multiple functions, results in a highly efficient control of the whole machine. This, together with the sequential action of the projection and retraction of the basket, opening and closing of the comb members, and rotation of the augers, enables the picking operation to be effected quickly and easily, with minimum damage to the fruit and the trees.

While in the foregoing there has been described and shown the preferred embodiment of the invention, various modifications and equivalents may be resorted to within the spirit and scope of the invention as claimed.

What is claimed is:

1. In a fruit picker, the combination of a picker head adapted to be supported by a movable boom, said head including a front basket with an open top, a rotatable auger mounted across the open top of the basket, power means for rotating said auger, a clamshell-type comb mounted on the basket for cooperation with said auger, said comb including upper and lower comb members movable toward and away from each other between an open position and a closed position wherein they complementally surround the front and top of said auger, and power means for opening and closing said comb members.

2. The device as defined in claim 1 wherein said picker head also includes a boom-supported rear portion, said front basket being projectable forwardly and retractable rearwardly relative to said rear portion, and power means for projecting and retracting the basket relative to the rear portion of said head.

3. The device as defined in claim 1 together with means for pre-adjusting the position of said comb members relative to each other and to said auger.

4. In a fruit picker, the combination of a picker head including a boom supported rear portion and a front basket projectable and retractable relative to said rear portion, a first reciprocating fluid motor for projecting and retracting said basket, a source of pressurized fluid, a basket-extend solenoid valve for admitting fluid to one end of said first reciprocating fluid motor to project said basket, and a basket-retract solenoid valve for admitting fluid to the opposite end of said first reciprocating fluid motor to retract said basket, a rotatable auger provided on the basket, a rotary fluid motor for rotating said auger in one direction, an auger-start solenoid valve for selectively admitting and cutting off pressurized fluid to and from said rotary fluid motor to selectively power said auger in one direction and remove power from auger, a clamshell-type comb having two sets of pivotally mounted teeth openable and closable around said auger, a second reciprocating fluid motor for opening and closing said teeth, a teeth-open solenoid valve for supplying fluid to one end of said second reciprocating motor to open said teeth, and a teeth-close solenoid valve for applying fluid to the other end of said second reciprocating motor to close said teeth, a source of electric power, a normally closed electric circuit including said teeth-open solenoid valve, a pair of normally-closed relay contacts and said source of electric power for energizing said teeth-open solenoid valve, a normally open comb-close circuit including a normally open teeth-close switch, a pair of normally-open relay contacts, said teeth-close solenoid valve, and said power source, a relay coil in circuit with said normally open teeth-close switch and said power source, said relay coil when energized by the normal closing of said teeth-close switch functioning to shift said normally-closed relay contacts to open position and to shift said normally-open relay contacts to closed position, basket-extend and retract circuits including said source of power, a double throw switch means for sensing the fully open and fully closed position of said teeth, a head-extend and retract switch having a movable contact normally biased to a neutral open position and a pair of opposite fixed contacts alternately engageable with said movable contact, one fixed contact of said extend-retract switch being in circuit with said basket-extend solenoid and the other fixed contact being in circuit with said basket-retract solenoid, and an auger-start circuit including said source of electric power, an auger on-off switch, a normally-open teeth position sensing switch having means for closing said teeth position sensing switch only when said teeth are closed, and said auger-start solenoid valve, said auger-start circuit being interrelated with said teeth-closed circuit by reason of said teeth position sensing switch so that said auger-start solenoid valve can only be energized when said comb teeth are closed, and said basket-extend and retract circuit being interrelated with said teeth closed circuit by reason of said double throw switch means for sensing the fully open and fully closed position of said comb teeth so that said basket-extend and basket-retract solenoid valves can only be energized when said teeth are fully open or fully closed.

5. In a fruit picker appartus, the combination of a movable base, a movable support boom movably mounted on said base, a fruit picker head, universal mounting means for supporting said picker head on the outer end of said boom, said picker head comprising a box like telescoping sectional fruit receptacle having a rear receptacle portion connected to said boom by said universal mounting means, and a front receptacle portion projectable forwardly and retractable rearwardly relative to said rear receptacle portion, motor operated fruit gathering means mounted on said front receptacle portion for picking fruit from a tree and depositing the fruit in said receptacle, a first power-operated motor means for swinging said picker head vertically relative to said boom, a second power-operated motor means for swinging said picker head horizontally relative to said boom, a third power-operated motor means for projecting and retracting said front portion of said picker head relative to said rear portion, and control means for separately controlling said first, second, and third power-operated motor means to move said picker head independently of said boom whereby when said movable base and said boom are positioned so that the picker head is adjacent a fruit tree, said head may be moved vertically and horizontally relative to said boom and the front portion of said head may be projected into different portions of a tree and retracted from the tree without movement of the boom.

6. The apparatus set forth in claim 5 wherein said universal mounting means includes a first pivot joint about which said head may swing in a horizontal plane, and a second pivot joint about which said head may tilt in a vertical plane.

7. The apparatus set forth in claim 5 wherein said rear portion of said picker head has an openable dump bottom, and power means for opening and closing said dump bottom.

8. The apparatus set forth in claim 5 together with a self-leveling operator's seat pivotally mounted on said picker head, and means mounting said control means in front of said operators seat.

9. In a fruit picker apparatus the combination of a movable supporting boom having a supported end and an outer end, a picker head, a universal type joint mounting said picker head on said boom at said outer end for tilting movement of the head in a vertical plane and swinging movement thereof in a horizontal plane, first power means for tilting the head, second power means for swinging the head, power driven fruit gathering means mounted on said head, a self-leveling operator's seat pivotally supported by said picker head, and manually operated controls located at said seat for actuating said fruit gathering means and said first and second power means.

10. The device as defined in claim 9 wherein said picker head includes a rear portion attached to said boom by said universal type joint and a front basket projectable forwardly and retractable rearwardly relative to said rear portion, said fruit gathering means being provided on said basket, and said operator's seat being supported by and disposed at one side of said rear portion of the head.

11. The device as defined in claim 9 together with a horizontal fulcrum projecting laterally from said picker head, said operator's seat being swingably suspended from said fulcrum, whereby to attain its self-leveling characteristics.

12. The device as defined in claim 11 together with an adjustable friction brake provided on said fulcrum to prevent free swinging movement of said seat.

13. In a fruit picker, the combination of a picker head including a boom-supported rear portion and a front basket projectable and retractable relative to said rear portion, power means for projecting and retracting said basket, a rotatable auger provided on the basket, power means for rotating said auger, a clamshell-type comb openable and closable around said auger, means for opening and closing said comb, and inter-related control means for both said power means for permitting projection and retraction of said basket only when said comb is fully opened or closed.

14. The device as defined in claim 13 wherein said inter-related control means is further characterized in that rotation of said auger can occur only when said comb is closed.

* * * * *